(12) United States Patent
Tschantz et al.

(10) Patent No.: US 8,814,987 B2
(45) Date of Patent: Aug. 26, 2014

(54) METHOD AND SYSTEM FOR REDUCING EMISSIONS FROM EVAPORATIVE EMISSIONS

(75) Inventors: Michael F. Tschantz, Lexington, VA (US); Peter D. McCrae, Covington, VA (US)

(73) Assignee: MeadWestvaco Corporation, Richmond, VA (US)

( * ) Notice: Subject to any disclaimer, the term of this patent is extended or adjusted under 35 U.S.C. 154(b) by 156 days.

(21) Appl. No.: 13/503,063

(22) PCT Filed: Oct. 28, 2010

(86) PCT No.: PCT/US2010/054468
§ 371 (c)(1),
(2), (4) Date: Apr. 20, 2012

(87) PCT Pub. No.: WO2011/053695
PCT Pub. Date: May 5, 2011

(65) Prior Publication Data
US 2012/0204720 A1    Aug. 16, 2012

Related U.S. Application Data

(60) Provisional application No. 61/255,701, filed on Oct. 28, 2009.

(51) Int. Cl.
*F02M 25/08* (2006.01)
*B60K 15/035* (2006.01)

(52) U.S. Cl.
USPC .............................................. 95/146; 96/132

(58) Field of Classification Search
USPC .............. 96/121, 126, 130–132; 95/146, 148; 123/518, 519
See application file for complete search history.

(56) References Cited

U.S. PATENT DOCUMENTS

| | | | |
|---|---|---|---|
| 5,337,721 A * | 8/1994 | Kasuya et al. ................ | 123/519 |
| 5,456,236 A | 10/1995 | Wakashiro et al. | |
| 5,456,237 A | 10/1995 | Yamazaki et al. | |
| 5,460,136 A | 10/1995 | Yamazaki et al. | |
| 5,477,836 A | 12/1995 | Hyodo et al. | |
| 5,564,398 A * | 10/1996 | Maeda et al. ................. | 123/520 |
| 6,279,548 B1 * | 8/2001 | Reddy ........................... | 123/520 |

(Continued)

FOREIGN PATENT DOCUMENTS

| | | |
|---|---|---|
| JP | 61-11062 | 1/1986 |
| JP | 63176650 | 7/1988 |

(Continued)

*Primary Examiner* — Frank Lawrence
(74) *Attorney, Agent, or Firm* — MWV Intellectual Property Group

(57) ABSTRACT

A method for reducing hydrocarbon emissions from automotive evaporative emissions control systems comprising steps of: contacting a vented fuel vapor stream from a fuel tank (1) with a first passive purge canister bed (5), the passive purge canister bed comprising a vapor adsorbent material and including a passive purge vapor inlet and a passive purge vapor outlet for vapor stream flow, —contacting a vapor stream from the passive purge vapor outlet with an active purge canister bed, the active purge canister bed (2) comprising a vapor adsorbent material; contacting the active purge canister bed with mechanically convected purge air, wherein the mechanically convected purge air is prevented from flowing through the passive purge canister bed; and contacting the passive purge canister bed with fresh purge air drawn passively by the fuel tank through the passive purge vapor outlet without first contacting said active purge canister bed.

7 Claims, 7 Drawing Sheets

(56) References Cited

U.S. PATENT DOCUMENTS

| | | | |
|---|---|---|---|
| 6,540,815 B1 * | 4/2003 | Hiltzik et al. | 95/146 |
| 7,008,470 B2 * | 3/2006 | Makino et al. | 96/131 |
| 7,543,574 B2 * | 6/2009 | Yamazaki et al. | 123/519 |
| 7,614,387 B2 * | 11/2009 | Wang et al. | 123/519 |
| 2008/0041226 A1 * | 2/2008 | Hiltzik et al. | 95/90 |
| 2008/0302341 A1 | 12/2008 | Reddy | |

FOREIGN PATENT DOCUMENTS

| | | |
|---|---|---|
| JP | 4-501314 | 3/1992 |
| JP | 8-42413 | 2/1996 |
| JP | 2002-349367 | 12/2002 |
| JP | 2008-144699 | 6/2008 |
| JP | 2009-79595 | 4/2009 |
| WO | WO2009061533 | 5/2009 |

* cited by examiner

US 8,814,987 B2

METHOD AND SYSTEM FOR REDUCING EMISSIONS FROM EVAPORATIVE EMISSIONS

CROSS-REFERENCE TO RELATED APPLICATIONS

This application is a National Phase application of PCT Application PCT/US10/54468, filed Oct. 28, 2010, which claims the benefit of U.S. Provisional Application No. 61/255,701, filed Oct. 28, 2009, each of which is incorporated herein by reference in their entirety.

FIELD OF THE DISCLOSURE

This disclosure relates to a method for reducing evaporative hydrocarbon emissions from automotive fuel storage systems that include activated carbon-filled canisters and/or adsorptive monolith-containing canisters wherein the monoliths include activated carbon, as well as to a use of such adsorbing canisters to remove volatile organic compounds and other chemical agents from fluid streams. The disclosure further relates to particular method and system employing passive and active purge canisters and/or canister bed sections for emission control. Moreover, this disclosure relates to decreasing the total mass of hydrocarbons that must be purged and consumed by the engine to fully regenerate the canister.

BACKGROUND OF THE DISCLOSURE

Evaporation of gasoline from motor vehicle fuel systems is a major potential source of hydrocarbon air pollution. The automotive industry is challenged to design engine components and systems to contain, as much as possible, the almost one billion gallons of gasoline evaporated from fuel systems each year in the United States alone. Such emissions can be controlled by canister systems that employ activated carbon to adsorb and hold the vapor that evaporates.

A typical canister system employed in a state of the art auto emission control system is shown in FIG. 1. An active purge canister 2 is connected to the fuel tank 1. The active purge canister 2 has a canister vent 3 and a purge line to the engine intake manifold 4. Some basic auto emission control system canisters are disclosed in U.S. Pat. Nos. 5,456,236; 5,456,237; 5,460,136; and 5,477,836.

These canisters and canister systems work to adsorb hydrocarbons released from the fuel system. Under certain modes of engine operation, the adsorbed hydrocarbon vapor is periodically removed from the carbon to form "regenerated carbon" by actively drawing air through the canister ("active purge") and burning the desorbed vapor in the engine. This regenerated carbon is then ready to adsorb additional vapor.

Typically, this "active purge" takes place while the engine is running and the engine manifold creates a vacuum which is used to draw air through the carbon canister. In order to completely purge a carbon canister back to its designed free capacity and to meet allowable emissions level, a significant volume of purge air is required (typically 100 to 400 times the volume of the canister).

Another means of carbon regeneration takes place through "passive purge" or "natural backpurge." The natural backpurge takes place throughout the day as the ambient air temperature drops. Typically, the warmest air temperatures are during the late afternoon and the coolest air temperatures are during the early morning hours. This natural temperature fluctuation is termed diurnal temperature fluctuation. As the ambient temperature increases, the temperature of the vehicle's fuel tank and its contents also increases. This temperature increase causes the air and vapors to expand and become less dense, and the increase also causes a rise in fuel vapor pressure and the evolution of fuel vapor to maintain vapor-liquid equilibrium. The net effects of these processes include: (1) a rise in gasoline vapor concentration within the tank vapor space, and (2) the venting of gasoline vapors and air from the fuel tank to maintain pressure equalization with an open line to atmosphere (or pressurization of the fuel tank if the tank is sealed from the atmosphere).

When the ambient temperature declines, the temperature of the fuel tank and the tank's contents also declines, and the opposite effect occurs. The air and gasoline vapors contract and increase in density. The vapor pressure of the fuel declines and causes fuel vapors in the ullage to condense into the liquid as the equilibrium vapor concentration declines. The net effect of these processes is the drawing of air into the fuel tank. When a carbon canister is placed in the tank vent, the air drawn into the tank during periods of ambient temperature drops is able to provide limited regeneration of the canister.

A typical 60 liter fuel tank, 40% filled with 7 psi Reid Vapor Pressure (RVP) gasoline, will vent approximately 35 grams of hydrocarbon vapor when heated from 65° F. to 105° F. A typical commercialized carbon canister will adsorb over 99% of these vapors for one to three days or more, depending upon need and design. When this same tank system is cooled from 105° F. to 65° F., approximately 5 to 7 grams of hydrocarbons will desorb and vent back to the fuel tank. Over a 24-hour cycle, the net carbon canister load is 28 to 30 grams.

Automotive manufacturers and systems designers are seeking methods to significantly reduce the volume of active engine purge required to regenerate the carbon canister and provide both the necessary level of adsorption capacity and meet vented emissions targets. Automotive manufacturers and system designers are also seeking methods to decrease the mass of gasoline vapors that must be delivered to the engine during purge. Automotive manufacturers are also seeking methods to reduce the average concentration of fuel vapors in the purge air by reducing the hydrocarbon concentration; the volume of purge air per unit time drawn through the canister to the engine may be increased with minimal impact on engine controls. For the system described above (a 60 liter fuel tank, 40% filled with 7 psi RVP fuel, undergoing a 24-hour diurnal cycle of 65° F. to 105° F. to 65° F.), the fuel tank will vent outward approximately 15.3 liters of air plus approximately 9.7 liters of gasoline vapors. A typical carbon canister applied to this system, designed to meet U.S. Federal emission standards, will be filled with an 11 or a 15 g/100 mL Butane Working Capacity (BWC) carbon to a volume of approximately 2 liters. The volume of Active Engine Purge required to suitably purge this canister after three days of loading will be 200 to 800 liters, or 4.4 to 17 times the total volume of air comprised in the load stream.

New engine technologies (such as gasoline direct injection) and hybrid electric arrangements are reducing the availability of purge air or ability to handle large hydrocarbons loads for carbon canister regeneration. Gasoline engines on hybrids only run intermittently, which reduces purge time. Gasoline direct injection engines operate with intake manifold vacuum levels much closer to atmospheric pressure than traditional internal combustion engines, which reduce the driving force for developing purge flow through the canister. Automakers have established targets of 10 to 75 bed volumes of purge (or 20 liters to 150 liters of purge air for the example discussed above) air to accommodate these new technologies.

These targets are based on either limitations for developing purge volumes or limitations on the mass of hydrocarbons the engine can tolerate, yet maintain drivability and exhaust targets, based on current hydrocarbon concentration in the purge.

Therefore, new technologies and innovations are required to allow these new engine technologies to meet environmental emission control standards. Automakers have also set these targets, not simply because of a need to reduce the volume of air purge, but also because new hybrid technologies and new environmental exhaust standards are reducing the amount of time available to purge. With current state of the art canister systems, a large purge volume equates to a high gasoline vapor purge load to the engine. Exhaust catalysts and engine controls cannot adequately fully oxidize the purged hydrocarbons in the allotted time and meet exhaust requirements. The ability to supply high volumes of purge air to the canister is not always the primary goal; the primary goal is often a reduction in the mass of hydrocarbons sent to the engine during purge. Thus, an alternative need is to reduce the mass of hydrocarbons in the canister that must be actively purged by the engine to fully regenerate the canister.

The present disclosure meets such innovative needs. One purpose of the present disclosure is to provide a cost-effective technology to meet these new purge targets established by the automakers to successfully bring new engine technologies to the consumer. Further purpose is to reduce the amount of gasoline vapors that will be purged from the canister/canister system and delivered to the engine with the purge air.

SUMMARY OF THE DISCLOSURE

A method for reducing hydrocarbon emissions from automotive evaporative emissions control systems is disclosed comprising steps of: (1) contacting a vented fuel vapor stream from a fuel tank with a first passive purge canister bed, the passive purge canister bed comprising a vapor adsorbent material and having a passive purge vapor inlet and a passive purge vapor outlet for vapor stream flow; (2) contacting the vapor stream from the passive purge vapor outlet with an active purge canister bed, the active purge canister bed comprising a vapor adsorbent material; (3) contacting the active purge canister bed with mechanically convected purge air, wherein the mechanically convected purge air is prevented from flowing through the passive purge canister bed; (4) contacting the passive purge canister bed with fresh purge air drawn passively by the fuel tank through the passive purge vapor outlet without first contacting the active purge canister bed, wherein the vented fuel vapor stream is prevented from being vented to the atmosphere without contacting both the passive purge canister bed and the active purge canister bed.

One embodiment of the present disclosure is an evaporative emissions control system for a vehicle comprising: (1) a fuel tank for storing a volatile fuel and adapted to consume said fuel, the fuel tank including a vent for the release of a vented fuel vapor stream; (2) a passive purge canister bed including a passive purge vapor inlet and a passive purge vapor outlet and containing fuel vapor adsorbent material for temporarily adsorbing and storing fuel vapor from the fuel tank; (3) an active purge canister bed containing fuel vapor adsorbent material for temporarily adsorbing and storing fuel vapor from the fuel tank; (4) a conduit for conducting fuel vapor from the fuel tank to the passive purge canister bed; (5) a fuel vapor purge conduit from the passive purge canister bed outlet to the active purge canister, wherein the vented fuel vapor stream from the fuel tank is contacted with the passive purge canister bed.

In further embodiments of the disclosure, the vapor adsorbent material in the active canister bed and/or passive canister bed are activated carbon derived from materials selected from the group consisting of wood, peat, coal, coconut, lignite, petroleum pitch, petroleum coke, coal tar pitch, fruit pits, nut shells, sawdust, wood flour, synthetic polymer, and natural polymer having been activated by a process selected from the group consisting of chemical, thermal, and combined chemical/thermal activation methods.

In further embodiments of the disclosure, the vapor adsorbent material in the active canister bed and/or passive canister bed are inorganic materials selected from the group consisting of zeolites, porous silica, porous alumina, pillared clays, molecular sieves, and combinations thereof. In a further embodiment, the vapor adsorbent materials in the active canister bed and/or passive canister bed are porous polymers. In yet further embodiment, the vapor adsorbent materials in the active canister bed and/or passive canister bed are in the form of a honeycomb or monolith shape.

In a further embodiment of the disclosure, the active canister bed is heated while the vehicle's engine is in operation. In still further embodiments, the system comprises a buffer bed section.

In further embodiments of the disclosure, the gasoline vapor load to the active canister bed is in the range of essentially zero to 0.25 grams of gasoline per liter of fuel tank volume. In four further embodiments, the gasoline vapor load to the active canister bed is (1) less than 0.25 grams of gasoline per liter of fuel tank volume; (2) less than 0.2 grams of gasoline per liter of fuel tank volume; (3) less than 0.1 grams of gasoline per liter of fuel tank volume; and (4) less than 0.05 grams of gasoline per liter of fuel tank volume, respectively.

The present disclosure relies upon two portions of a canister such that the passive section only sees the amount of air from backpurging to ensure that the backpurging is maximized. The second portion is actively purged.

DESCRIPTION OF THE DISCLOSURE

One goal of the present disclosure is to improve the efficiency and regenerating capacity of the backpurge phenomenon through the use of a first "passive" canister and/or canister bed section to reduce the load of hydrocarbons feeding a second "active" canister and/or canister bed section.

Backpurge occurs naturally in most carbon canister systems installed on automobiles, but the automakers and canister designers have not taken full advantage of its potential. A more efficient use of backpurge may be employed through the use of passively purged canisters and/or passively purged canister bed sections. Passively purged canisters do not require the use of any active purge from the engine or other forced convection processes; the purge is only that induced from the cooling period of a diurnal temperature cycle. A passive purge canister is one designed to build up a very heavy heel or high concentration of hydrocarbons, so that intra-particle and axial-canister redistribution of hydrocarbons are minimized; the backpurge airflow remains nearly or fully saturated with hydrocarbons. A key aspect of the system is to allow daily natural backpurge to deliver fresh air to the passive purge section and to keep the majority of the mass transfer zone contained within the passive purge section on an on-going basis.

The embodiments of the present disclosure permit a passively purged canister and/or passively purged canister bed section to be efficiently employed in series with an actively purged canister and/or canister bed section through the novel use of check valves or pressure relief valves and an optional "buffer" canister. The functionality of these checkvalves or pressure relief valves require a positive pressure differential across the valve in the direction of desired flow to open or "crack" the valve. This requirement will cause the fuel tank pressure to fluctuate between the positive and negative cracking pressures required to provide airflow out of and into, respectively, the fuel tank. Commercially available valves exist that can maintain this pressure fluctuation within the range of +10 inches of water column to −10 inches of water column pressures, if not within a tighter range. The purpose of the buffer canister, or an equivalent section of buffer bed, is to smooth out the concentration of hydrocarbons vented from the passive canister sections to the active canister sections. The buffer canister prevents low hydrocarbon-concentrated air to strip hydrocarbons from the active canister.

Figure 1:
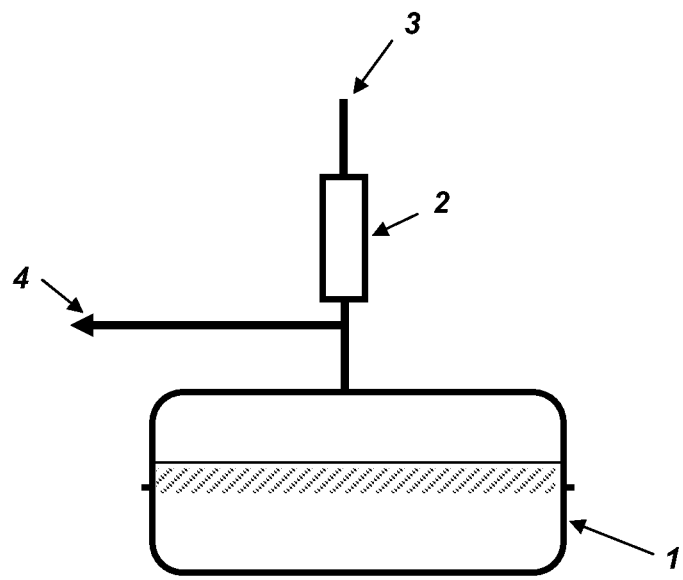
FIG. 1 shows, in cross-section, a prior art canister system.
Figure 2:
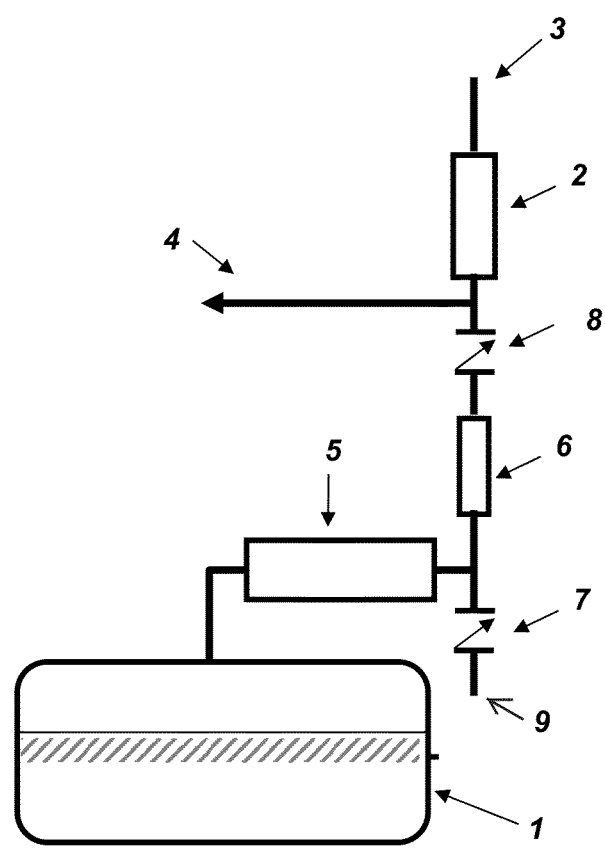
FIG. 2 shows, in cross-section, one embodiment of the disclosure.

FIG. 2 details a first embodiment of the present disclosure. This first embodiment, FIG. 2, comprises three canisters: (a) a passive purge canister 5, (b) a buffer canister 6, and (c) an active purge canister 2. When the fuel tank pressure increases, the fuel tank 1 vents fuel vapors and air outward through the passive purge canister 5, through the buffer canister 6, and through the active purge canister 2. The tank inlet check valve 7 prevents air or vapors from venting to the atmosphere without first passing through the buffer canister 6 and through the active purge canister 2. The fuel tank inlet vent 9 is connected to the tank inlet check valve 7.

When the fuel tank pressure becomes negative (relative to atmospheric), which occurs when the ambient temperature drops or fuel is pumped out of the fuel tank during vehicle operation, the fuel tank inlet check valve 7 permits air to be drawn in and naturally purge the passive purge canister 2 while stabilizing the fuel tank 1 pressure. The fuel tank outlet check valve 8 prevents air from being drawn towards the passive purge canister 5 from the canister vent 3 or from the purge line to engine 4. Microleaks or permeation through this valve device could be problematic to meet stringent evaporative emissions requirements such as partial zero emissions vehicle (PZEV). A small carbon bed or filter (less than 100 mL) could be added in series with the vent line, on the atmospheric side of the valve device, to adsorb any leaks or permeation losses and effectively be purged during in-breathing. The buffer canister 6, therefore, is never backpurged. The active purge canister 2 is designed such that the pressure drop through the active purge canister 2 during engine purge is less than the cracking pressure and pressure drop through the two check valves and the buffer canister 6 to ensure purge air flows only through the active purge canister 2. While the engine is in operation, the active purge canister 2 is purged as typical in the industry.

A passive purge canister 5 is attached to the automotive fuel tank vent, which permits the fuel to breathe during temperature changes or changes in atmospheric pressure. In one embodiment, the passive purge canister 5 has a volume of 0.004 liters of carbon per liter of fuel tank capacity to 0.07 liters of carbon per liter of fuel tank capacity. In one embodiment, the length to diameter ratio of the passive purge canister 5 is in the range of 1:1 to 10:1. Of course other volumes and length to diameter ratios are possible, depending upon the desired target of decreased loading to the active purge canister. The activated carbon should be of the variety appropriate for regenerable gasoline vapor control. Two ports are present on the passive purge canister 5: (1) a tank side port, and (2) a vent side port. The tank side port provides communication of vapors between the passive purge canister 5 and the fuel tank 1; the vent side port provides communication of vapors between the passive purge canister 5 and a piping "tee." A checkvalve (the fuel tank inlet check valve 7) is attached to one tee outlet, which is configured such that flow may be directed only towards the "tee." A buffer canister 6 is connected to a second outlet of the "tee." The buffer canister 6 is filled with activated carbon and has a volume of 0.010 liters to 1.0 liters. The length to diameter ratio of the buffer canister 6 may range between 0.5:1 to 10.0:1. Of course other volumes and length to diameter ratios is possible dependant upon the desired target of decreased loading to the active purge canister. The buffer canister 6 has two ports: (1) a tank side port, and (2) a vent side port. The tank side port provides communication of vapors between the buffer canister 6 and the passive purge canister 5, while the vent side port provides communication of vapors between the buffer canister 6 and the fuel tank outlet check valve 8. The fuel tank outlet check valve 8 is configured such that vapor flow may only proceed in the direction away from the fuel tank and towards the active purge canister 2.

The active purge canister 2 may be an activated carbon filled canister with a volume of 0.0008 liters of carbon per liter of fuel tank capacity to 0.033 liters of carbon per liter of fuel tank capacity. The active purge canister 2 may be filled with activated carbon that is suitable for regenerable gasoline vapor adsorption. The length to diameter ratio of the active purge canister 2 may range between 1:1 to 10:1. Of course other volumes and length to diameter ratios is possible dependant upon the desired target of decreased loading to the active purge canister. The active purge canister 2 may be plumbed such that one end is in vapor communication with both the fuel tank outlet check valve 8 and the engine's intake or intake manifold. The other end of the active purge canister 2 is in vapor communication with the atmosphere, possibly via a filter.

The system is designed to allow vapors and air that vent from the fuel tank 1, when it becomes positively pressurized relative to atmospheric pressure, to serially pass through the passive purge canister 5, the buffer canister 6, the fuel tank outlet check valve 8, and the active purge canister 2. When the tank becomes negatively pressurized relative to atmospheric pressure, the system is designed such that air will be induced to flow in through the fuel tank inlet check valve 7, through the passive purge canister 5, and into the fuel tank 1. While the vehicle is operating, engine purge actively draws air from the atmosphere and into the canister vent. Flow progresses through the active purge canister 2 and through the purge line to engine 4.

Those skilled in the art understand that the adsorbents utilized in the canisters/canister bed sections of the embodiments of the disclosure at hand are adsorbents which may include activated carbon from a variety of raw materials, including wood, peat, coal, coconut, synthetic or natural polymer, and a variety of processes, including chemical and/ or thermal activation, as well as inorganic adsorbents, including molecular sieves, porous alumina, pillared clays, zeolites, and porous silica, and organic adsorbents, including porous polymers. The adsorbents may be in granular, spherical, or pelletized cylindrical shapes, or may be extruded into special thin-walled cross-sectional shapes, such as hollow-cylinder, star, twisted spiral, asterisk, configured ribbons, or other shapes within the technical capabilities of the art. In shaping, inorganic and/or organic binders may be used. The adsorbents may be formed into a monolith or honeycomb part. The adsorbents may be incorporated into a canister as one or more layers, or separate chambers, or they may be inserted in the fluid stream flow as auxiliary canister beds.

In the context of the disclosure, "monolith" is intended to include foams, woven and non-woven fibers, mats, blocks and bound aggregates of particulates.

The embodiment depicted in FIG. 2 allows for the following beneficial outcomes to occur: (1) the passive purge canister 5 remains highly loaded with gasoline vapors; (2) the buffer canister 6 stabilizes the concentration of hydrocarbon vapors feeding the active canister and minimizes potential stripping of adsorbed hydrocarbons loaded on the active canister during out-breathing of the fuel tank; and (3) the fuel tank inlet check valve 7 and its location allow fresh air to purge the passive purge canister 5 with each cooling period of the diurnal cycle.

The passive purge canister 5 remains highly loaded with gasoline vapors. This high state of loading permits the limited volume of passive purge to remain saturated. The purge air can remain saturated at concentrations well above 30% vapor concentration. With proper design (e.g., 0.05 liters 11 BWC carbon per liter of fuel tank capacity and a length to diameter ratio greater than 4:1), the passive purge canister 5 may control venting emissions to levels greater than 90% reduction to the atmosphere. This canister 5 may reduce the load to the active canister 2 by up to 95%. The amount of gasoline vapors that must be purged off the active canister 2 and burned by the engine may be reduced by up to 95% relative to current technology.

The buffer Canister 6 stabilizes the concentration of hydrocarbon vapors vented from the passive purge canister 5 to the active purge canister 2. This is particularly important for multi-day diurnals to prevent significant wavefronts from developing in the active purge canister 2. After a cool-down period of a diurnal cycle, the passive purge canister 5 will be partially purged, particularly at the vent end of the canister. Subsequently, when the system warms during the heating portion of a diurnal cycle, a low concentration of gasoline vapors will vent from the passive purge canister. Without a buffer canister 6, the gasoline concentration of this air/vapor stream will be low and could purge gasoline vapors off the active purge canister 2 towards the canister vent, particularly if it is the second or greater day after the active purge canister 2 is actively purged. The buffer canister 6 is never purged, so the air/vapor stream will enrich in gasoline vapors by stripping gasoline vapors off when the concentrations of gasoline vapors are very low coming out of the passive purge canister 5; the buffer canister 6 will then adsorb vapors when the gasoline vapor concentrations are very high coming out of the passive purge canister 5.

The fuel tank inlet check valve 7 and its location allow fresh air to purge the passive purge canister 5 with each cooling period of the diurnal cycle. This allows the mass transfer zone to remain mostly confined within the passive purge canister 5 and prevents the relatively high-boiling vapor components from migrating to the active purge canister 2. The active purge canister 2 thus only needs to have easily purged, light-ends removed during the active purge from the engine.

Figure 3:
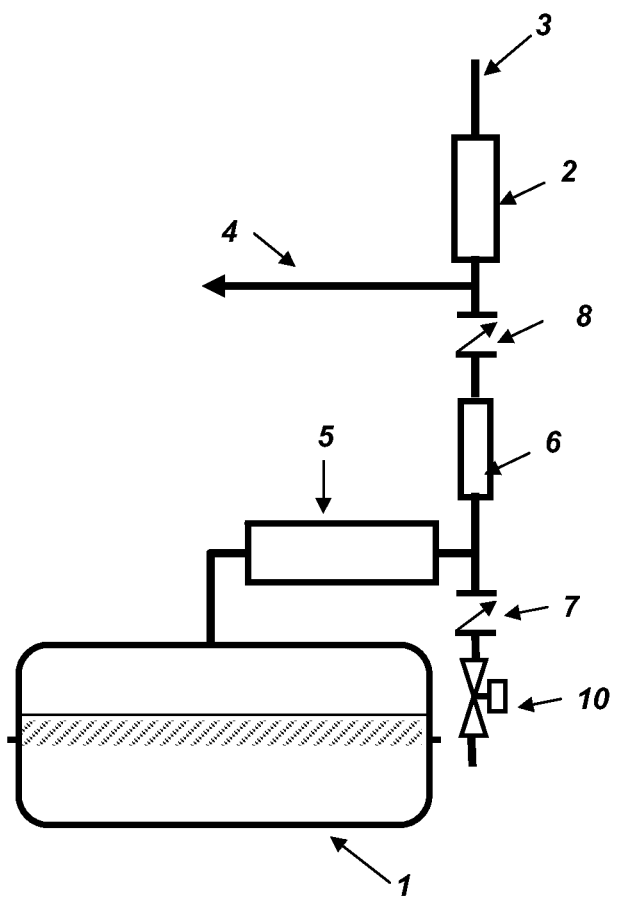
FIG. 3 shows, in cross-section, a second embodiment of the disclosure.

FIG. 3 depicts a second embodiment of the present disclosure. This second embodiment, FIG. 3, comprises three canisters: (a) a passive purge canister 5, (b) a buffer canister 6, and (c) an active purge canister 2. When the fuel tank pressure increases, the fuel tank 1 vents fuel vapors and air outward through the passive purge canister 5, through the buffer canister 6, and through the active purge canister 2. The tank inlet check valve 7 prevents air or vapors from venting to the atmosphere without first passing through the buffer canister 6 and through the active purge canister 2. The fuel tank inlet automatic valve 10 is normally open in the un-energized state and remains open unless the active purge canister 2 is being purged by the engine.

When the fuel tank pressure becomes negative (relative to atmospheric), the fuel tank inlet check valve 7 permits air to be drawn in and naturally purge the passive purge canister 5 while stabilizing the fuel tank pressure. The fuel tank outlet check valve 8 prevents air from being drawn towards the passive purge canister 5 from the canister vent or from the purge line to engine 4. The buffer canister 6, therefore, is never backpurged. The fuel tank inlet automatic valve 10 is energized and closed during periods of active purge. Thus, this valve eliminates the chance of air being drawn in due to the engine manifold vacuum used to draw air in through the canister vent. While the engine is in operation, the active purge canister 2 is purged as typical in the industry.

Figure 4:
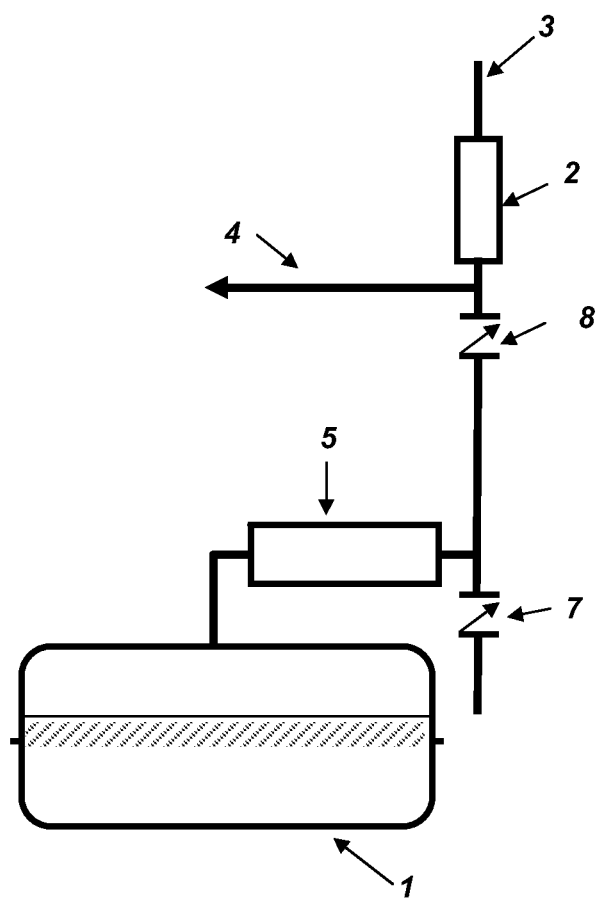
FIG. 4 shows, in cross-section, a third embodiment of the disclosure.

FIG. 4 depicts a third embodiment of the present disclosure. This third embodiment, FIG. 4, comprises two canisters: (a) a passive purge canister 5 and (b) an active purge canister 2. The passive purge canister 5 is designed in a manner such that an outlet section of activated carbon is bypassed when passive purge air is drawn inward when the fuel tank pressure becomes negative. This bypassed section of carbon effectively serves as the buffer canister.

When the fuel tank pressure increases, the fuel tank vents fuel vapors and air outward through the passive purge canister 5 and through the active purge canister 2. The tank inlet check valve 7 prevents air or vapors from venting to the atmosphere without first passing through the active purge canister 2.

When the fuel tank pressure becomes negative (relative to atmospheric), the fuel tank inlet check valve 7 permits air to be drawn in and naturally purge the passive purge canister 5 while stabilizing the fuel tank pressure. The fuel tank outlet check valve 8 prevents air from being drawn towards the passive purge canister 5 from the canister vent or from the purge line to engine 4. While the engine is in operation, the active purge canister 2 is purged as typical in the industry.

Figure 5:
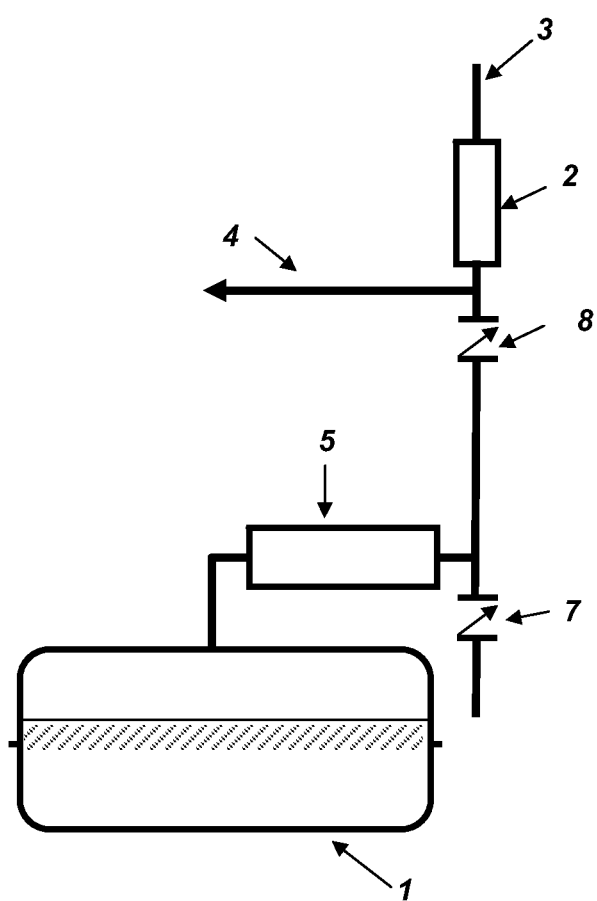
FIG. 5 shows, in cross-section, a fourth embodiment of the disclosure.

FIG. 5 depicts a fourth embodiment of the present disclosure. This fourth embodiment, FIG. 5, comprises two canisters: (a) a passive purge canister 5 and (b) an active purge canister 2. When the fuel tank pressure increases, the fuel tank 1 vents fuel vapors and air outward through the passive purge canister 5 and through the active purge canister 2. The tank inlet check valve 7 prevents air or vapors from venting to the atmosphere without first passing through the active purge canister 2.

When the fuel tank pressure becomes negative (relative to atmospheric), the fuel tank inlet checkvalve permits air to be drawn in and naturally purge the passive purge canister while stabilizing the fuel tank pressure. The fuel tank outlet check valve prevents air from being drawn towards the passive purge canister from the canister vent or from the purge line to the engine. While the engine is in operation, the active purge canister is purged as typical in the industry.

Figure 6:
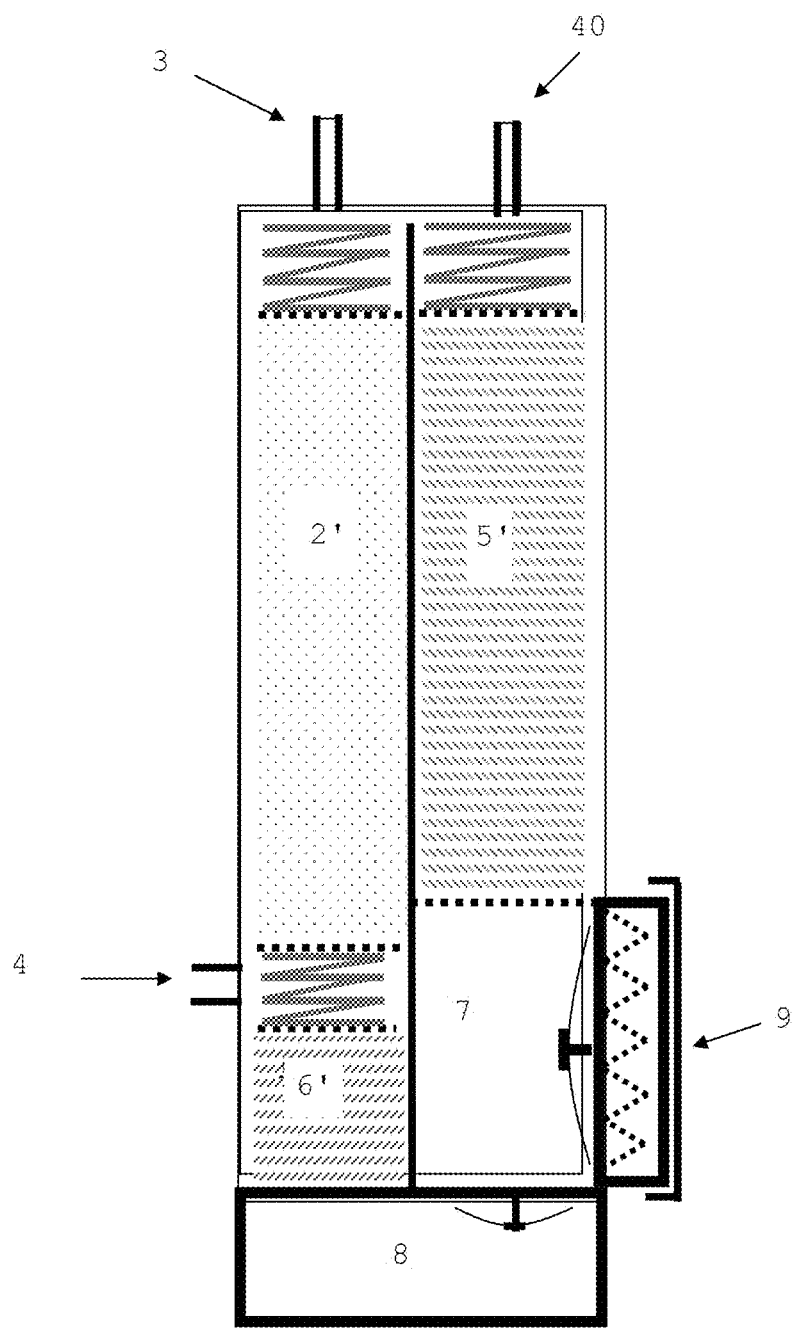
FIG. 6 shows, in cross-section, a fifth embodiment of the disclosure.

FIG. 6 depicts a fifth embodiment of the present disclosure. This fifth embodiment, FIG. 6, comprises three canister bed sections within one canister system: (a) a passive purge canister bed section 5'; (b) a buffer bed section 6'; and (c) an active purge canister bed section 2'. The passive purge canister bed section 5' includes a fuel tank port 40 on one end and a tank inlet checkvalve 7 of the fuel tank inlet vent 9 on the other end. One end of the buffer bed section 6' connects to an outlet checkvalve 8, while the other end connects to an active purge port to engine 4 and the active purge canister bed section 2'. The active purge port to engine 4 connects to the other end of the active purge canister bed section 2'.

Figure 7:
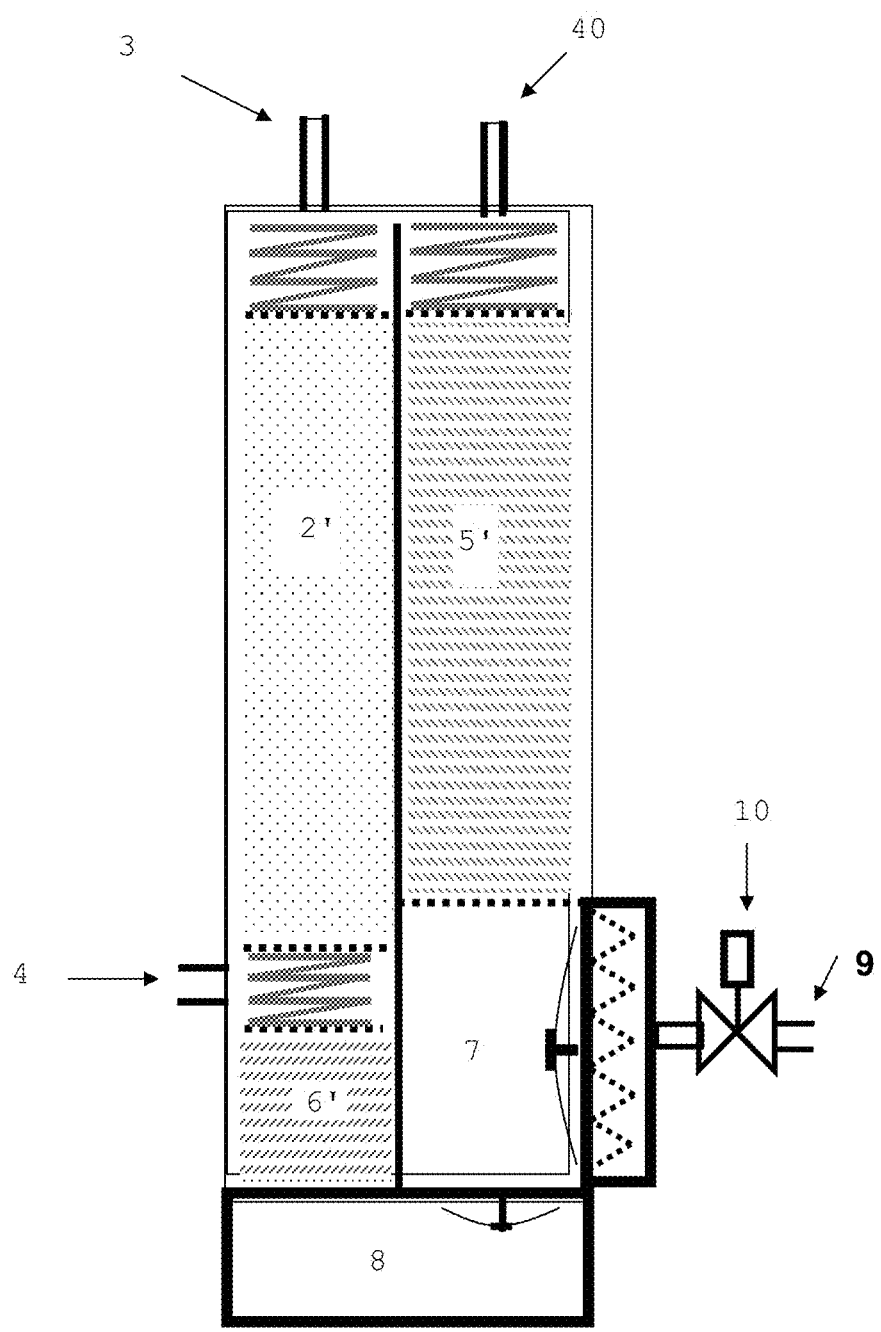
FIG. 7 shows, in cross-section, a sixth embodiment of the disclosure.

FIG. 7 depicts a sixth embodiment of the present disclosure. This sixth embodiment, FIG. 7, comprises three canister bed sections within one canister system: (a) a passive purge canister bed section 5'; (b) a buffer bed section 6'; and (c) an active purge canister bed section 2'. The passive purge canister bed section 5' includes a fuel tank port 40 on one end and a fuel tank inlet checkvalve 7 on the other end. One end of the buffer bed section 6' connects to a fuel tank outline checkvalve 8, while the other end connects to an active purge port to engine 4 and the active purge canister bed section 2'. The active purge port to engine 4 connects to the active purge canister bed section 2' and buffer section 6'. There is also a fuel tank inlet automatic valve 10 connecting the fuel tank inlet checkvalve 7 on one end and a fuel tank inlet vent 9 on the other end. When desired, there may be filters located on either side of the automatic valve 10.

All embodiments in FIGS. 2-5 show the same general design of a passive purge canister followed by an active purge canister. All canister beds can be designed to fit within one or more total canister systems (see FIGS. 6 and 7). The general design principle is to limit the amount of purge available in the tank side (i.e., passive purge canister) to allow a very high concentration of adsorbed hydrocarbons to build and permit high efficiency passive purge.

In order for the systems depicted in the embodiments of the present disclosure to operate correctly, the checkvalves (or other suitable means/device of vapor flow control such as pressure relief valves) must be designed such that the active purge from the engine does not cause air to be drawn through the fuel tank outlet check valve and the fuel tank inlet check valve. An alternative to prevent this "short circuiting" is to incorporate an automated valve on the vent side of the fuel tank inlet check valve. This automatic valve would be normally open (in the non-energized state) and would close during periods of active purge.

Through the embodiments of the present disclosure, the daily mass of hydrocarbon vapors that are required to be purged by the engine and combusted in the engine may be reduced by up to 95%. Furthermore, a greater volume of purge air may be utilized without overloading the engine with gasoline vapors, which could otherwise cause idling problems or added exhaust emissions.

Additionally, the embodiments of the present disclosure accomplish the added benefit of ensuring that the hydrocarbons that are purged by the engine will have an averaged lower molecular weight. These hydrocarbons will have a higher vapor pressure and will purge more easily to the engine than the heavier molecular weight hydrocarbons, which will concentrate in the passively purged canister. The lighter molecular weight components are more easily fully combusted by the engine relative to heavy molecular weight components also present in gasoline; therefore, the impact on exhaust emissions are further reduced relative to current practice. The volume of purge air required to fully regenerate the canister and meet emission targets will be reduced relative to current practice.

This disclosure method and system includes embodiments wherein the active purge canister bed, passive purge canister bed and option buffer canister bed may be located within one canister or are located in more than one canister.

In one embodiment of the method and system of the present disclosure, the vapor adsorbent materials in the active and/or passive canister beds are activated carbon derived from materials selected from the group consisting of wood, peat, coal, coconut, lignite, petroleum pitch, petroleum coke, coal tar pitch, fruit pits, nut shells, sawdust, wood flour, synthetic polymer, and natural polymer having been activated by a process selected from the group consisting of chemical, thermal, and combined chemical/thermal activation methods.

In one embodiment of the method and system of the present disclosure, the vapor adsorbent materials in the active and/or passive canister beds are inorganic materials selected from the group consisting of zeolites, porous silica, porous alumina, pillared clays, and molecular sieves.

In one embodiment of the method and system of the present disclosure, the vapor adsorbent materials in the active and/or passive canister beds are porous polymers.

In one embodiment of the method and system of the present disclosure, the adsorbent materials in the active and/or passive canister beds are in the form of high voidage shapes selected from the group consisting of stars, hollow cylinders, asterisks, spirals, cylinders, configured ribbons, and other shapes within the capabilities of the art.

In one embodiment of the method and system of the present disclosure the active and/or passive canister beds are adsorbent in the form of a honeycomb or monolith shape.

In one embodiment of the method and system of the present disclosure, the active and/or passive canister beds further comprise inert spacer particles, foams, fibers, and screens external to the vent-side adsorbent particles and monoliths.

The foregoing description relates to embodiments of the present disclosure, and changes and modifications may be made therein without departing from the scope of the disclosure as defined in the following claims.

Prophetic Example 1

Systems and methods for reducing evaporative hydrocarbon emissions from automotive fuel storage systems including activated carbon particulate-filled canisters and/or adsorptive monolith-containing canisters and utilizing the embodiments of the present disclosure depicted in FIGS. 2-7 may be tested. For purposes of comparison, the fuel tank may be filled to forty percent (40%) capacity by volume with 7 psi RVP gasoline.

The systems may be placed in an environmental chamber and repeatedly exposed, over 30 days, to a simulated 65° F. to 105° F. to 65° F. 24-hour diurnal cycle to allow hydrocarbon concentrations to stabilize in the passive purge canister and optional buffer canister. The gasoline in the fuel tank would be replaced every three (3) days. For the final cycle, the gasoline vapor load to the active canister would be in the range of essentially zero to 0.25 grams of gasoline per liter of fuel tank volume; including all ranges contained therein. In one embodiment, the gasoline vapor load to the active canister in the final cycle would less than 0.25 grams of gasoline per liter of fuel tank volume. In a second embodiment, the gasoline vapor load to the active canister in the final cycle would be less than 0.2 grams of gasoline per liter of fuel tank volume. In a third embodiment, the gasoline vapor load to the active canister in the final cycle would be less than 0.1 grams of gasoline per liter of fuel tank volume. In a fourth embodiment, the gasoline vapor load to the active canister in the final cycle would be less than 0.05 grams of gasoline per liter of fuel tank volume.

A current state-of-the-art system would likely have a gasoline vapor load to the active canister in the final cycle (when utilizing the methodology above) in the range of 0.37 to 0.5 grams of gasoline per liter of fuel tank volume. Therefore, as compared to a current state-of-the-art system, various embodiments of the present disclosure are capable of reducing the gasoline vapor load to the active canister by approximately 30 percent (30%) to greater than 95 percent (95%); including all ranges contained therein.

Tested Example 1

A system was assembled in the form of that shown in FIG. 2. A commercially available 60 liter fuel tank 1, filled to 40% capacity by volume with 7 psi RVP gasoline, was connected to a 1.9 liter passive purge canister 5, filled with a commercially available 11 g/100 mL BWC pelletized carbon, BAX 1100. A 0.38 liter buffer canister 6 was also filled with an 11 g/100 mL BWC pelletized carbon, BAX 1100. The active canister 2 had a volume of 1 liter and was filled with 0.7 liters of a commercially available 11 g/100 mL BWC pelletized carbon, BAX 1100 plus 0.3 liters of a commercially available 6 g/100 mL BWC pelletized carbon, BAX LBE, in series. The length to diameter ratio of the passive purge canister, buffer canister, and active purge canister was 8:1, 3.5:1, and 4:1, respectively. The two checkvalves employed were commercially available and utilized ⅜ inch Viton diaphragms.

The system was placed in an environmental chamber and repeatedly exposed, over 60 days, to a simulated 65° F. to 105° F. to 65° F. 24-hour diurnal cycle to allow hydrocarbon concentrations to stabilize in the passive purge canister and the buffer canister. The gasoline in the 60 liter fuel tank was replaced weekly. The active purge canister was weighed daily to measure daily loading and fully purged daily with over 1000 liters of purge air.

The 60 liter fuel tank vented between 25 and 35 grams of gasoline vapor daily. The passive purge canister captured between 22 and 32 grams of these vapors, and a remaining 3 to 7 grams vented past the buffer canister and loaded onto the active canister. The volume of air vented daily from the 60 liter fuel tank was approximately 9.1 liters, and the full 9.1 liters of air vented daily through the passive purge canister, through the buffer canister, and through the active purge canister. The average concentration of gasoline vapors vented from the 60 liter fuel tank was 38% by volume; the average concentration of gasoline vapors loaded to the active purge canister was reduced to 3% to 8% by volume.

A traditional, state of the art canister system used to control vapor emissions from this same 60 liter fuel tank system for a period of three days is approximately 2 liters in volume and requires 300 to 600 liters of purge to fully regenerate. This canister would also deliver up to approximately 85 grams of gasoline vapor to the engine during purge. The active purge canister in the system tested during this study only loaded with 9 to 21 grams of gasoline vapors over a three day period; the amount of gasoline vapors that are necessary to be delivered to the engine during active purge was reduced by approximately 75% to 90%. Furthermore, the volume of purge air required to fully regenerate the active canister was reduced to 100 to 150 liters from the current state of the art, or a reduction of 50% to 83%.

We claim:

1. A method of reducing fuel vapor emissions in an automotive evaporative emissions control system for a vehicle comprising steps of:
    (a) contacting a vented fuel vapor stream from a fuel tank with a first passive purge canister bed, the passive purge canister bed comprising a vapor adsorbent material and including a passive purge vapor inlet and a passive purge vapor outlet for vapor stream flow;
    (b) contacting the vapor stream from the passive purge vapor outlet with an active purge canister bed, the active purge canister bed comprising a vapor adsorbent material;
    (c) contacting the active purge canister bed with mechanically convected purge air, wherein the mechanically convected purge air is prevented from flowing through the passive purge canister bed; and
    (d) contacting the passive purge canister bed with fresh purge air drawn passively by the fuel tank through the passive purge vapor outlet without first contacting the active purge canister bed;
       wherein the vented fuel vapor stream is prevented from being vented to an atmosphere without contacting both the passive purge canister bed and the active purge canister bed.

2. The method of claim 1 further comprising a step of providing a buffer bed section locating between the passive purge canister bed and the active purge canister bed.

3. The method of claim 1 wherein the vapor adsorbent material in the active canister bed, or the passive canister bed, or both the active canister and the passive canister beds includes activated carbon derived from materials selected from the group consisting of wood, peat, coal, coconut, lignite, petroleum pitch, petroleum coke, coal tar pitch, fruit pits, nut shells, sawdust, wood flour, synthetic polymer, and natural polymer having been activated by a process selected from the group consisting of chemical, thermal, and combined chemical/thermal activation processes.

4. The method of claim 1 wherein the vapor adsorbent material in the active canister bed, or the passive canister bed, or both the active canister and the passive canister beds includes inorganic materials selected from the group consisting of zeolites, porous silica, porous alumina, pillared clays, and molecular sieves.

5. The method of claim 1 wherein vapor adsorbent material in the active canister bed, or the passive canister bed, or both the active canister and the passive canister beds includes porous polymers.

6. The method of claim 1 wherein the vapor adsorbent material in the active canister bed, or the passive canister bed, or both the active canister and the passive canister beds are in a form of a honeycomb or monolith shape.

7. The method of claim 6 wherein the active canister bed is heated while the vehicle's engine is in operation.

* * * * *